United States Patent [19]

Ernst

[11] Patent Number: 5,028,578

[45] Date of Patent: Jul. 2, 1991

[54] OXYGEN ABSORBENT AND USE THEREOF

[76] Inventor: R. Ernst, Rehbergstrasse 4, D-8000 Munich 71, Fed. Rep. of Germany

[21] Appl. No.: 378,035

[22] Filed: Jul. 11, 1989

[30] Foreign Application Priority Data

Aug. 23, 1988 [DE] Fed. Rep. of Germany ....... 3828531
Feb. 1, 1989 [DE] Fed. Rep. of Germany ....... 3902921

[51] Int. Cl.$^5$ .......................... B01J 20/10; B01J 20/22
[52] U.S. Cl. ..................................... 502/404; 502/407
[58] Field of Search ................ 502/401, 403, 404, 407

[56] References Cited

U.S. PATENT DOCUMENTS 4,524,015 6/1985 Takahashi et al. .................. 502/401

FOREIGN PATENT DOCUMENTS

| | | | |
|---|---|---|---|
| 2520792 | 11/1976 | Fed. Rep. of Germany . | |
| 48092 | 5/1978 | Japan | 502/401 |
| 48093 | 5/1978 | Japan | 502/401 |
| 159837 | 12/1980 | Japan | 502/401 |
| 52528 | 3/1984 | Japan | 502/404 |
| 3062547 | 3/1988 | Japan | 502/401 |
| 3063696 | 3/1988 | Japan | 502/401 |

OTHER PUBLICATIONS

European Search Report dated 2/1/90.

*Primary Examiner*—Carl F. Dees
*Attorney, Agent, or Firm*—Staas & Halsey

[57] ABSTRACT

An oxygen absorbent, namely based on a combination of an absorbent in the form of porous, precipitated silicic acid as the water carrier and which is characterized by a mixture, in which the organic substances are formed by glucose and glucose oxidase and in which the particle or pore gaps of the precipitated silicic acid and other solids are at least kept partly free from water. In order to obtain a free-flowing mixture, it is advantageous if at least 40% of the particle or pore gaps are kept free from water, said value serving as a guide value. Simultaneously use is made of calcium carbonate, calcium hydrogen phosphate, magnesium carbonate or sodium hydrogen carbonate as absorbents or reaction accelerators. The invention also permits the use of a bag, tablet or pellets in mini containers containing this oxygen absorbent mixture for keeping food fresh.

9 Claims, No Drawings

OXYGEN ABSORBENT AND USE THEREOF

BACKGROUND OF THE INVENTION

The present invention relates to an oxygen absorbent according to the preamble of claim 1 and to the use thereof.

Such an oxygen absorbent is e.g. known from DE-2836876 C2.

Oxygen absorbents are used to keep fresh or preserve packaged foods, such as e.g. dried milk, ground coffee, rough-ground grain, certain sausage and meat products, chocolates, fat-containing long-life pastries, etc. In this way it is also possible to prevent oxidative decomposition of sensitive medicaments.

Keep-fresh bags with oxygen-absorbing iron products according to the above teaching have long been known and used. During the packaging of the food or medicaments, said bag is added to the pack. The packs are then immediately sealed in a gas-tight foil or film, so that immediately following packing the oxygen content of the pack is irreversibly absorbed by the oxygen-absorbing substance.

However, iron-containing products suffer from the disadvantage that in the case of an accidental destruction of the bag the iron product together with its catalyst is mixed with the food and is possibly eaten. Intentional or unintentional consumption can also not be excluded. From the consumer safety standpoint, such products should consequently not be used.

The same applies with respect to the also known keep-fresh bags based on ascorbic acid. For the activation of the oxygen absorption of the ascorbic acid, it is necessary to add heavy metal salts, so that there are also in this case serious reservations regarding consumer safety.

The problem of the present invention is therefore to improve the aforementioned agents in such a way that the aforementioned disadvantages are avoided. It must be suitable for use in a bag as a food preserving agent and must be safely mixable or edible with the food. Other use forms consist of the addition in tablet form to a pack, or fixing to a pack. It must also be possible to incorporate in a composite foil or film made from one-sided gas-permeable and gas-impermeable material. In this use form the gas-permeable film faces the product to be protected, so that the oxygen to be absorbed passes through the permeable film to the absorbing agent. This use form has the advantage that the consumer does not perceive, at least not in a disturbing manner, the oxgyen absorber. The same applies regarding the use of the pack in connection with medicaments.

A possible system for this purpose is the combination of glucose and glucose oxidase.

A further requirement from the practical use of the keep-fresh bag is that the oxygen is absorbed within a pack in a short time, i.e. between hours and max 1 to 2 days, otherwise the decay of the food induced by the oxygen can commence.

There were considerable, hitherto unsolved difficulties in connection with the use of glucose and glucose oxidase. According to the prior art the more liquid (water) that is available for the diffusion of the reactants with respect to one another and for the conveying away of the reacted products the better functions the enzymes and the substance combinations. Thus, enzymatic reactions take place most quickly in a liquid product, the reaction speed attainable being a decisive factor for economics and usability. However, according to the existing teaching the less water is present, the slower an enzymatic reaction takes place.

The liquid to pasty combinations of glucose and enzymes prepared according to this prior art had completely inadequate oxygen absorption from the time standpoint and even after several days could not completely absorb the oxygen from the packs.

Naturally it is possible to increase the reaction or absorption rate by increasing glucose oxidase addition. However, glucose oxidase is a very expensive product and this procedure would not be economically appropriate. In fact, the necessary economics are only attainable through minimizing the glucose oxidase proportion.

Silicic acids for combination with liquids have been used in practice for many years. They have a very large surface per weight unit and are in part present as almost spherical particles. A silicic acid with an average particle diameter of 100 my e.g. has a surface of approximately 200 m$^2$/g.

The first tests with silicic acid were carried out in accordance with the prior art. Comparatively large water quantities and corresponding glucose and glucose oxidase quantities were mixed with the silicic acid to a pasty mass and once again led to completely inadequate oxygen absorption rates.

SUMMARY OF THE INVENTION

Only on working, contrary to the prevailing teaching, with smaller water additions (in the case of otherwise identical glucose and glucose oxidase amounts), was there surprisingly found to be a much higher absorption rate.

In the case of such preparations the liquid is initially distributed as so-called adhesive water in an extremely fine film on the available silicic acid particle surface. The film thicknesses are approximately 1/100 my on adding approximately one g of water per g of silicic acid. It could be assumed that in this dimensional range due to the molecular adhesive forces occurring between the solid and liquid there would be none of the necessary diffusion towards and away from the enzyme and therefore no absorption; however, the opposite is clearly the case. In the case of further liquid additions, at the contact points of the particles so-called wedge water forms and subsequently the pores or particle gaps are filled with water.

As the absorption rate decreases to technically no longer usable values with increasing water quantities, it can be assumed that the particle gaps gradually filling with water and referred to here as pores prevent the enzymatic reaction, in that they probably decisively reduce the oxygen migration to the glucose and the enzyme, contrary to the hitherto held opinion.

The use of silicic acid as the carrier on adding comparatively small water percentages, surprisingly sped up the absorption to a technically and economically usable range. A positive secondary effect was the obtaining of a mixture which, as a substantially dry mixture, can be technically processed much more easily.

DESCRIPTION OF THE PREFERRED EMBODIMENTS

In the German Federal Republic, as well as most other European countries, Japan and the USA, silicic acid is a permitted food additive.

Thus, according to the present invention glucose, glucose oxidase, water and precipitation silicic acid ($SiO_2$) are intermixed in such a ratio that a mixture is obtained with a network of liquid-free pores or a mixture with an adequate number of pores through which the oxygen to be removed can diffuse in gaseous manner to the glucose/glucose oxidase. In other words the particle or pore gaps of the precipitated silicic acid and other admixed solids are kept at least partly free from water.

If an adequately free-flowing mixture is to be produced, it has proved advantageous for at least 40 or more % by volume of the available particle gaps not to be filled with liquid. The more water which is not absorbed by the silicic acid particles as adhesive water, but fills as wedge water the silicic acid particle gaps and in the case of even more liquid as capillary or particle gap water, the greater the decrease in the oxygen absorption rate and it finally drops to a fraction of the initial rate when the gaps are completely filled. Mixtures enriched with so much water are no longer usable.

The aforementioned pore volume relates to a mixture obtained in accordance with the prior art by mixing in a powder mixer and subsequently spraying the liquid during the continuing mixing process. This preparation procedure is recommended, if the absorbent is to be filled as a powder and in free-flowing form into oxygen-permeable bags.

However, applications exist where it is not appropriate to add the absorbent in powder form. In the case of liquids in bottles, it is in many cases appropriate to link the agent in an appropriate form with closing corks or caps. In the case of foods in pasty form, there is a risk that during storage and transportation the bag will mix and stick to the food and will thereby impair the selling quality. In such cases it is appropriate to compress the agent prepared in accordance with the above teaching using a tabletting agent and to insert same as a tablet, e.g. in a crown cork between the sealing foil and the metal, or in a very small plastic box to stick or otherwise fix it to the cover of the packs, or to incorporate it in pellet or otherwise compressed form into foils or films.

Processing to a tablet offers the advantage that for certain addition methods manipulatability or handling is much better, or is in fact made possible and the volume of the finished absorbent is approximately 50% smaller than in the uncompressed state.

It has surprisingly been found that the absorptivity of the agent was in no way reduced by the compression and in fact partly improved. However, it was found that at the instant when the pore volume or pores completely disappeared or decreased towards zero through compression in the tabletting machine, there was a dramatic or marked decrease in the absorption rate of the oxygen.

An indication of a reduced pore volume is e.g. the start of water elimination from the mixture during tabletting.

A free-flowing mixture is prepared in the aforementioned manner for producing tablets or pellets. The tablets or pellets are then produced by compression. Obviously pellets can also be obtained directly by extrusion using formulations according to the invention. As the gas pore volume decreases during compression, it is advantageous to operate with a lower water percentage.

According to the prior art finished absorber mixtures in the form of powders after filling into bags or tablets immediately following production are sealed in quantities of 100, 200 or more in gas-tight films, which are only opened again at the time of the final use, so that the complete absorption capacity is retained up to the time of use.

As is known, gluconic acid forms on oxidizing glucose. This gluconic acid lowers the pH-value rapidly to a range where the enzyme is deactivated or the oxygen absorption rate decreases to unusable values. Therefore an acid-binding substance must be added to the system. However, it must not be a substance which adjusts the system to a basic range prior to the start of oxygen absorption, because a marked basic range irreversibly damages the activity of the enzyme. However, the known liquid buffers have an inadequate absorption or oxygen binding capacity. It has surprisingly been found that calcium hydrogen phosphate, which is only sparingly soluble in water, has an adequate acid binding capacity, without bringing the system into an inadmissibly high basic range prior to the start of absorption. This product is eminently suitable for many applications, particularly if a carbon dioxide atmosphere is not desired for sensory reasons. It is also possible to use sodium hydrogen phosphate, but the latter suffers from the disadvantage of setting the mixture in an alkaline pH-range (pH approx. 8-9), so that once again the oxygen absorption rate is reduced and possibly the activity of the enzyme is irreversibly impaired.

A further disadvantage of both iron products and ascorbic acid products is that through the absorption of the oxygen in the pack, a vacuum is formed. In many cases this vacuum leads to an unattractive deformation of the pack and, as a result of the minute micropores often present oxygen subsequently passes into the pack, so that after a short time the entire absorption capacity of the bag is consumed and preservation is no longer ensured.

To avoid in many cases, highly undesired formation of a vacuum, suitable substances have been sought which liberate the same carbon dioxide quantity for the absorbed oxygen. It has surprisingly been found that through the addition of calcium carbonate (or magnesium carbonate) which is substantially insoluble in water, the absorption rate can be significantly improved to more than double. Simultaneously and in almost stoichiometric form carbon dioxide is released for a corresponding carbonate excess for the absorbed oxygen.

Thus, the addition of calcium carbonate considerably speeds up the absorption rate and simultaneously prevents the formation of a disturbing, prejudicial vacuum in the pack.

(Calcium carbonate and, magnesium carbonate and calcium hydrogen phosphate are permitted food additives and are authorized in much the same countries as the enzymes).

Sodium hydrogen carbonate has also proved suitable and the requisite quantities compared with the calcium carbonate can be obtained through stoichiometric conversion of the reaction with gluconic acid.

Thus, according to the teaching of the invention calcium carbonate is added to the glucose in a ratio of 1:5 to 1.5:1 and in this way brings about vacuum compensation and speeds up the absorption rate. As a result of the latter, it is once again possible to decisively reduce the economically decisive glucose oxidase proportion in the mixture.

The following mixing ranges have proved to be particularly effective: In each case 1 g of glucose is mixed with 0.35 to 1.5 g of precipitation silicic acid, 0.15 to 0.8 g of calcium carbonate and 0.025 to 0.25 cm$^3$ of glucose oxidase (activity of the oxidase min. 1500 titrimetric units/ml), together with 0.5 to 1.5 cm$^3$ of water.

A typical, optimized formulation with a maximum absorption capacity of 100 ml of pure oxygen (corresponding to 500 ml of air) consists, according to the inventive teaching, of 2 g of glucose, 1.8 g of precipitated silicic acid, 0.9 g of calcium carbonate, 2.2 cm$^3$ of water and 0.11 cm$^3$ of glucose oxidase of activity 1500. Following intense mechanical mixing, this mixture is free-flowing and is filled into four or three-sided sealed edge bags and packed gas-tight up to the time of use.

A bag of a corresponding oxygen-permeable foil or paper produced according to this formulation removes all the oxygen from a pack containing 400 ml of air after 20 hours. The same formulation, but in which calcium hydrogen phosphate was used in place of calcium carbonate required more than 40 hours to achieve the same result. However, it is suitable for practical use if no $CO_2$ atmosphere is required.

A similar formulation consists of 2 g of glucose, 1.5 g of silicic acid, 1.9 cm$^3$ of water, 0.9 g of calcium carbonate and 0.11 cm$^3$ of glucose oxidase (activity 1500). The oxygen was removed from the same volume as hereinbefore in 21 hours using this formulation. Obviously there is also a lower limit for the water content below which the reaction speeds would be considerably reduced. In this respect the above formulation shows a first reduction of the absorption rate.

A further formulation consists of 2 g of tablettable glucose such as e.g. Emdex (manufactured by Finnsugar), 1.5 g of silicic acid, 1.7 g of water, 0.2 g of microcrystalline cellulose, 0.8 g of calcium carbonate and 0.11 cm$^3$ of glucose oxidase of activity 1500. This mixture can be tabletted, whilst reducing the volume by approximately 50%. Such a mixture can naturally also be compressed on an extruder and subsequently filled in pellet form into bags or mini containers.

In a further formulation 2 g of glucose, 1.5 g of silicic acid, 0.9 g of calcium carbonate, 0.11 cm$^3$ of glucose oxidase (activity 1500) and 2.6 cm$^3$ of water are mixed together. The oxygen from the same volume as hereinbefore (400 ml) was only absorbed after 2.5 days. Although there is a clear absorption speed reduction through the start of pore filling, cases exist when this absorption rate may still be adequate.

In another formulation, where no use was made of silicic acid, i.e. 2 g of glucose mixed with 0.9 g of calium carbonate, 2.8 g of water and 0.11 cm$^3$ of glucose oxidase of activity 1500, the oxygen was still not completely absorbed after more than 4 days.

The same result as with the formulation without silicic acid was obtained with a formulation of 2 g of glucose, 1.5 g of silicic acid, 0.9 g of calcium carbonate, 4.3 cm$^3$ of water and 0.11 cm$^3$ of glucose oxidase (activity 1500). It was apparent in the case of the latter mixture that there were no further liquid-free pores.

The last two formulations are unsuitable for practical use.

In those cases where silicic acid is undesired for food technology reasons, it can be replaced by microcrystalline cellulose, defatted, ground soybeans, or ground wheat bran with slightly modified formulations.

In some cases it is desirable, particularly in the case of transparent packaging of the food, to obtain information as to whether the pack is still in tact, or whether oxygen has penetrated into it and can no longer be absorbed. According to the present invention this is achieved by adding a color changing pH-indicator.

As the resulting gluconic acid greatly reduces the pH-value, only a correspondingly sparing calcium carbonate dosing is required, so that after e.g. 80% decomposition of the glucose, no further calcium carbonate is available and consequently the pH-value starts to drop sharply. Whereas in the case of adequate calcium carbonate dosing the pH-value is approximately 7, it then drops rapidly to around 4, so that e.g. a litmus indicator changes from red to blue and thereby indicates that the absorption capacity is almost exhausted and the pack must be consumed. This indication is advantageous compared with the known pure oxygen indicators (cf. DE 2836876), in that it indicates when there is a decrease in the capacity of the absorber to absorb oxygen, instead of merely indicating when oxygen has already penetrated the pack. The obvious prerequisite is that in this case part of the absorber pack must be finished with a transparent film.

I claim:

1. Oxygen absorbent comprising: a mixture of an absorbent in the form of porous, precipitated silicic acid as a water carrier, water and organic substances including glucose and glucose oxidase, wherein particle or pore gaps of the precipitated silicic acid and the organic substances are kept at least partly free from water.

2. Oxygen absorbent according to claim 1, wherein at least 40% by volume of the particles or pore gaps of the precipitated silicic acid and the organic substances are kept free from water to form a substantially free-flowing product.

3. Oxygen absorbent according to claim 2, wherein after mixing and subsequent compressing of the substantially free-flowing product, tablets or pellets can be formed having a residual pore structure.

4. Oxygen absorbent according to claims 1 to 3, wherein calcium and/or magnesium carbonate is used as a reaction accelerator and/or carbon dioxide donor.

5. Oxygen absorbent according to claims 1 to 3, wherein sodium hydrogen carbonate is used as a reaction accelerator and/or carbon dioxide donor.

6. Oxygen absorbent according to claims 1 to 3, wherein sodium hydrogen phosphate is used as an acid binder.

7. Oxygen absorbent according to claims 1 to 3, wherein calcium hydrogen phosphate is used as an acid binder.

8. Oxygen absorbent according to claim 4, characterized in that the calcium and/or magnesium carbonate to glucose quantity ratio is 1:5 to 1.5:1.

9. Oxygen absorbent according to claims 6 and 7, wherein a pH-indicator is used which changes color following consumption of the acid binder.

* * * * *